March 19, 1968  G. R. ASCHAUER  3,373,853
HYDRAULICALLY ACTUATED MECHANISM
Filed April 29, 1966  2 Sheets-Sheet 1

INVENTOR:
GEORGE R. ASCHAUER
BY:
James E. Nilles
ATTORNEY

# United States Patent Office 3,373,853
Patented Mar. 19, 1968

3,373,853
HYDRAULICALLY ACTUATED MECHANISM
George R. Aschauer, Racine, Wis., assignor to Twin Disc Clutch Company, Racine, Wis., a corporation of Wisconsin
Filed Apr. 29, 1966, Ser. No. 546,227
4 Claims. (Cl. 192—85)

ABSTRACT OF THE DISCLOSURE

Hydraulically actuated mechanism, such as a clutch or the like, in which the actuating fluid is introduced from a stationary or non-rotating parts and is directed into a rotating part having retaining means for then channelling the fluid to the actuating chamber or other locations. Thus the fluid is injected as a stream and drawn into the rotating part by centrifugal force. An adjusting scoop tube is also used for removing fluid in combination with the above means for introducing the fluid, which combination provides an efficient, sensitive and accurately controllable mechanism.

---

This invention relates to fluid actuated devices, such as hydraulically operated clutches or the like. More specifically, the invention relates to improved means for introducing the fluid, which is used for operating or cooling the various parts, into the rotating mechanism.

Prior art devices of this general character have various chambers into which the fluid must be introduced, such as the clutch piston actuating and release chambers, or passages for permitting the fluid to flow past and cool the friction clutch surfaces. These prior art devices usually introduce the fluid through the rotating parts by means of rifle drilling, rotating seals and the like. Such construction is not only costly but results in inefficient mechanism which cannot be accurately and sensitively controlled, particularly at higher speeds or pressures. This is due in part to the fact that fluid in such rotating shafts acts as a centrifugal pump and requires considerable pressure simply to force the fluid into the shaft and the proper chamber. The pressure thus required precludes sensitive, accurate and responsive control of a modulatable clutch, for example, at high operational speed or pressures.

In accordance with the present invention, mechanism is provided in a device of the above type for introducing the hydraulic fluid from a stationary member, thereby eliminating the need for rifle drilling or holes in the rotating parts and the use of rotary seals. The fluid so introduced is drawn by centrifugal force into the various chambers which have been designed to hold the fluid captive and, if desired, convey it to other chambers.

A more specific aspect of the invention relates to means for introducing fluid from a stationary member into a rotating actuating chamber and in combination with adjustable scoop tube which serves to remove fluid from a rotating "release" chamber. This combination provides a particularly efficient, sensitive, and accurately controllable mechanism which is compact, has low maintenance and can be produced at a relatively low cost.

These and other objects and advantages of the present invention will become apparent as this disclosure progresses, reference being had to the accompanying drawings, in which.

Figure 1:
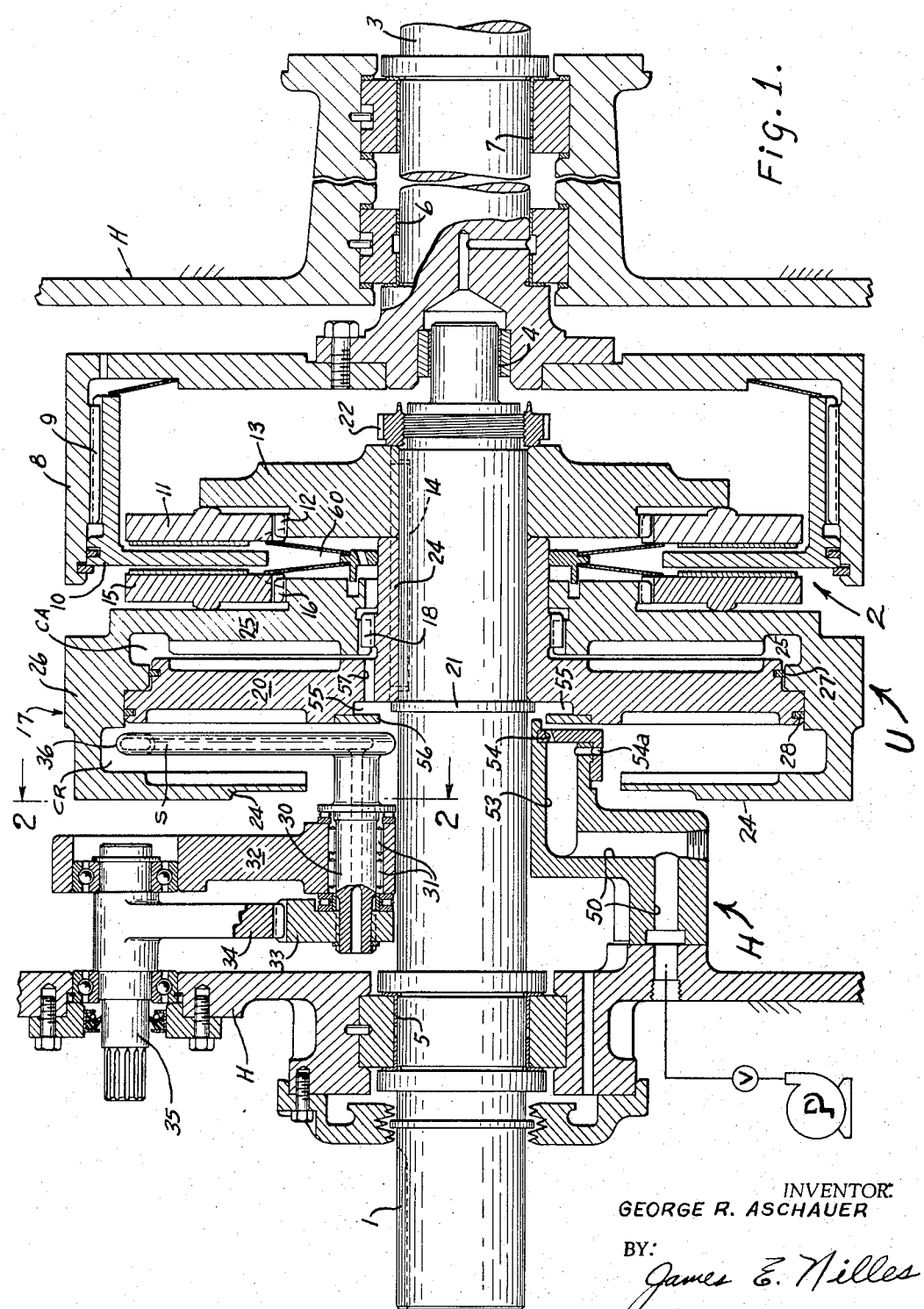
FIGURE 1 is a longitudinal cross sectional view through a fluid operated mechanism made in accordance with the present invention.

Referring in greater detail to the drawings, a mechanism has been shown for the purpose of illustrating the invention, which includes a power input shaft 1 and a friction clutch 2 which connects it to an output shaft 3. Shaft 1 is piloted in the sleeve bearing 4 in the end of shaft 3 and is otherwise supported on bearing 5 mounted in the housing H. Shaft 3 is suitably mounted on sleeve bearings 6 and 7 in the housing H. Hydraulically operated means in the form of a cylinder and piston unit U is mounted on the shaft 1 for causing actuation of the friction clutch 2.

A cylindrical drum 8 is rigidly secured to the output shaft 3 and has a series of internal splines 9 to which is axially slidable a clutch plate 10. A clutch plate 11 is fixed for rotation with shaft 1 as by being splined at 12 to a backup plate 13 fixed by key 14 to shaft 1. Another clutch plate 15 is secured by the splines 16 to an annular piston 17 fixed by splines 18 on an axially fixed reaction member 20. Member 20 is then in turn fixed to shaft 1 by key 14 so as to rotate therewith and a shoulder 21 formed with shaft 1 holds the reaction member 20 rigidly against the backup member 13. Lock nut 22 threaded to the end of shaft 1 holds member 13 against axial movement in that direction. Thus the input member may be considered as comprising shaft 1, backup member 13, the annular piston 17 and the clutch plates 11 and 15. The output member may be considered as comprising the driven plate 10, drum 8 and output shaft 3.

The annular piston 17 has been shown as of one piece construction for clarity in the drawing, but in practice it could be made of more than one piece in order to permit manufacture and assembly. This annular piston is mounted for axial sliding on its spline connection 18 and relative to shaft 1 and this piston includes radial side walls 24 and 25 and a peripheral portion 26 which is in sealing engagement with reaction member 20 by means of the seals 27 and 28. The annular piston 17, together with the reaction member 20 which it encloses, defines a clutch actuating chamber CA and the clutch release chamber CR which are of the expansible chamber type and alternately pressurized with fluid to cause expansion and consequent clamp up of the clutch 2, or release thereof. More specifically, when fluid pressure is introduced into chamber CA, the annular piston is shifted to the right as viewed in the drawings, thereby causing the clutch pates 11 and 15 to clamp tightly in driving engagement with the driven plate 10 of the output member.

Figure 2:
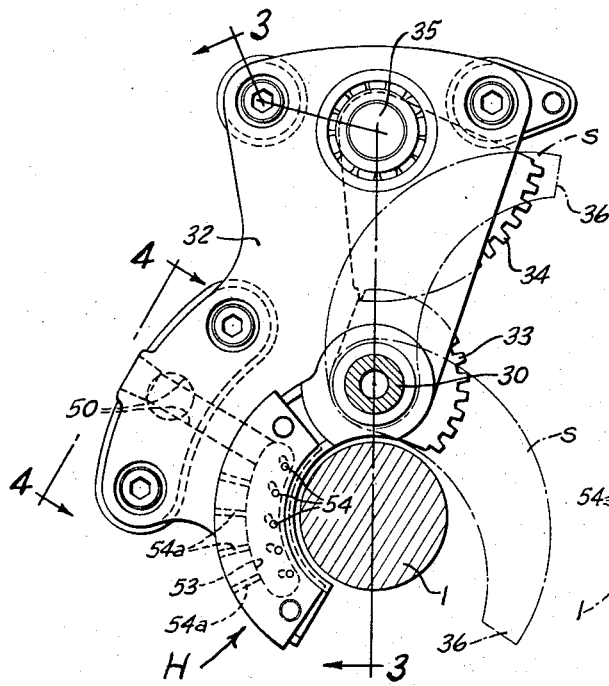
FIGURE 2 is a transverse cross sectional view taken generally along the line 2—2 in FIGURE 1.
Figure 3:
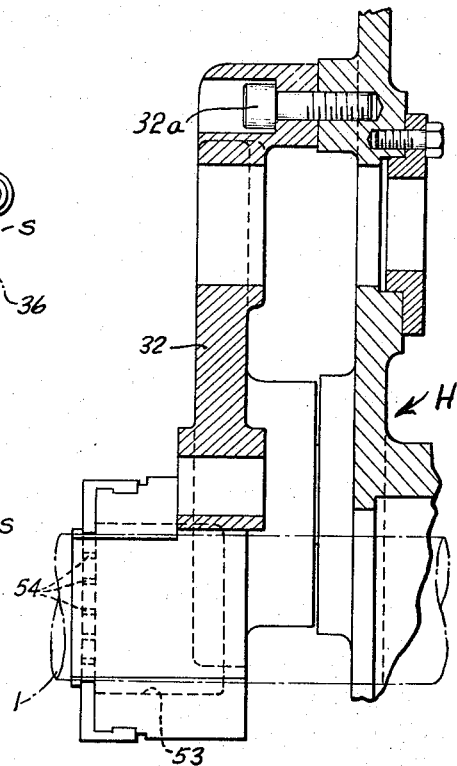
FIGURE 3 is a sectional view taken along line 3—3 in FIGURE 2.
Figure 4:
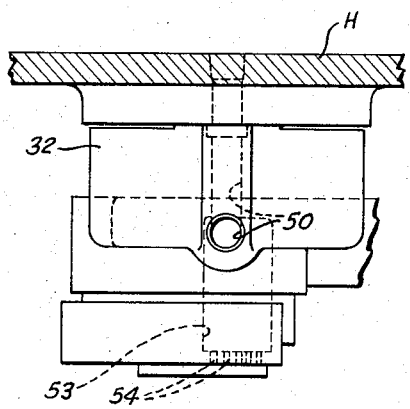
FIGURE 4 is a sectional view taken along line 4—4 in FIGURE 2.

A scoop tube S is mounted for adjustable oscillation in the clutch release chamber CR for the purpose of removing oil from the chamber in accordance with the radial position to which it has been adjusted. This scoop tube is mounted on shaft 30 which in turn is journalled on anti-friction bearings 31 in the stationary portion 32 of the housing H. Member 32 can be considered an integral part of the housing and is secured thereto by bolt means 32a (FIGURE 3). The housing is a stationary member. Shaft 30 has a segment gear 33 fixed thereon which meshes with another segment gear 34 fixed to the shaft 35. Oscillation of shaft 35 causes consequent radial adjustment of the open end 36 of the scoop tube. The scoop tube construction may be of the type shown in my copending application Ser. No. 371,967 filed June 2, 1964, which issued on May 10, 1966 as U.S. Patent No. 3,250,358, and it is believed sufficient for purposes of the present invention, simply to say that the scoop tube may be oscillatingly adjusted between the broken line positions shown in FIGURE 2 for the purpose of varying the amount of fluid in the clutch release chamber, as desired. When the scoop tube is in the radially outermost position shown, most of the fluid will be extracted and only a minimum amount of fluid will be retained in the chamber CR, resulting in a clutch engaged position. Conversely, when the scoop tube is in the radially innermost position, the clutch release chamber CR is full of oil which causes the annular piston 17 to be moved to the left (as viewed in FIGURE 1), thus releasing the clutch 2.

In accordance with the present invention, novel means is provided for introducing the actuating fluid into the clutch actuating chambers. This fluid may also flow past the clutch plates 11 and 15 for cooling them.

Passage means are formed in the stationary housing H for conducting pressure fluid from its source, such as a pump P, through a flow rate regulating valve V, to a fluid discharge outlet. This means takes the form of drilled holes 50 (FIGURES 1, 2, and 3) which lead to a manifold chamber 53. The discharge outlet is formed by a series of jet openings 54 (FIGURES 1, 2, 3 and 4) arranged in an arcuate path and closely adjacent a fluid receiving pocket 55 formed in the rotating reaction member 20. Pocket 55 is defined by a plate 56 fixed to the reaction member and has its open side facing radially inwardly so that fluid discharged from the jet holes 54 enters the pocket. Centrifugal force maintains the pocket 55 full and fluid therefrom flows through the passage 57 and into the actuating chamber CA. Openings 54a from the manifold permit the discharge of fluid into the clutch release chamber CR.

Fluid can then also flow axially to the passages formed between the splines 18 from which it flows into the area 60 between the clutch plates 11 and 15.

In this manner the fluid for either of the actuating chambers or for cooling the clutch plates is introduced from a stationary member and into suitable cavities, pockets or passages formed in the rotating elements for distribution to the desired area.

The present design has eliminated the need for rifle drilling or rotary seals in the rotating parts and the fluid so introduced does not pass through a rotating member but instead is from a stationary source. There is no centrifugal pumping pressure to be overcome, and exceptionally good response in these actuating mechanisms is made possible by the present invention.

Various modes of carrying out the invention are contemplated as being within the scope of the following claims particularly pointing out and distinctly claiming the subject matter which is regarded as the invention:

1. In a hydraulically actuated mechanism including a stationary housing, a shaft journalled in said stationary housing, a rotating element fixed to said shaft for rotation therewith and having an expansible fluid chamber, passage means extending from an external source of fluid and into said stationary housing and having a discharge outlet adjacent to but radially inwardly of said expansible fluid chamber, and means for introducing pressure fluid from said external source and to said passage means whereby said fluid is discharged from said outlet of said passage means and into said expansible fluid chamber of said rotating element, a second chamber defined by said rotating element, and a scoop tube mounted on said stationary housing and extending radially into said second chamber for extracting fluid therefrom.

2. The combination as defined in claim 1 including means for oscillatingly mounting said scoop tube on said stationary housing for radial adjustment of said tube.

3. The combination as defined in claim 1 further characterized in that said rotating element also defines a fluid receiving pocket having an open side facing radially inwardly for receiving fluid from said discharge outlet, and said element also has a passage placing said pocket in fluid delivering communication with said expansible fluid chamber.

4. The mechanism as defined in claim 1 including a second rotating element, and friction clutch means between said rotating element and said second rotating element, said clutch means being actuated by pressurization of said expansible fluid chamber.

References Cited
UNITED STATES PATENTS

| | | | |
|---|---|---|---|
| 1,858,514 | 5/1932 | Lell | 192—85 |
| 2,210,416 | 8/1940 | Kiep et al. | 192—105 |
| 2,381,786 | 8/1945 | Tyler | 192—105 X |
| 2,517,955 | 8/1950 | Zimmermann | 192—105 |
| 3,295,646 | 1/1967 | Peterson | 192—85 |

FOREIGN PATENTS

| | | |
|---|---|---|
| 176,791 | 10/1906 | Germany. |

BENJAMIN W. WYCHE III, *Primary Examiner.*